Feb. 2, 1926.                                                          1,571,679
J. F. O'CONNOR
FRICTION SHOCK ABSORBING MECHANISM
Filed Dec. 10, 1921
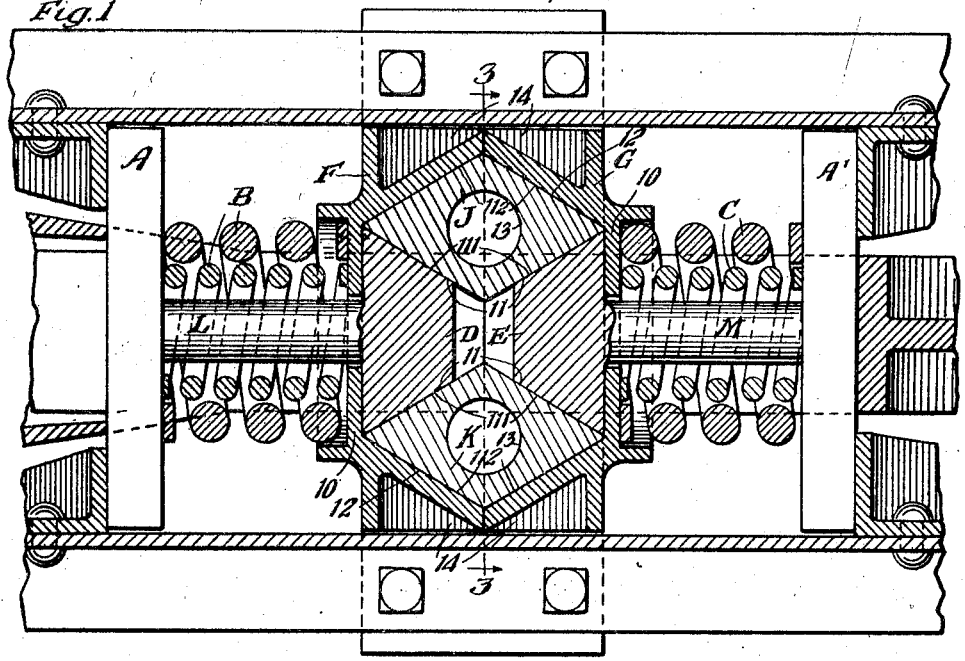
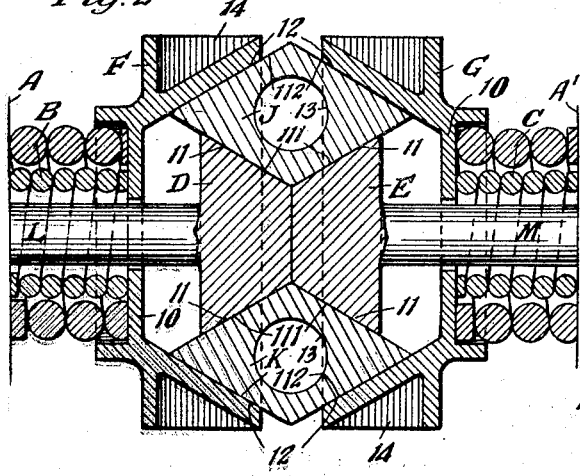
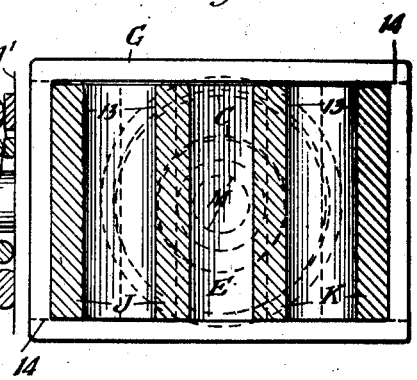
Witnesses
Inventor
John F. O'Connor
By Geo. J. Haight
His Atty Patented Feb. 2, 1926.

1,571,679

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 10, 1921. Serial No. 521,300.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a simple and efficient friction shock absorbing mechanism especially adapted for railway draft riggings and wherein the friction parts are so designed that they may be manufactured at comparatively small expense.

In the drawing forming a part of this specification, Figure 1 is a horizontal, longitudinal, sectional view of a portion of a railway draft rigging showing my improvements in connection therewith. Figure 2 is a horizontal, sectional view, parts broken away, corresponding to Figure 1 but illustrating the condition of the parts at the end of the full compression stroke. And Figure 3 is a vertical, transverse, sectional view of the shock absorbing mechanism proper corresponding to the line 3—3 of Figure 1.

In said drawing, the shock absorbing mechanism is shown associated with draft sills and front and rear stop lugs of a car underframe of usual form.

The shock absorbing mechanism proper, as shown, comprises front and rear main followers A and A'; front and rear springs B and C; front and rear wedges D and E; front and rear friction shells F and G; side wedge-friction shoes J and K; and column or pressure-transmitting plungers L and M.

The front and rear main followers A and A' are preferably of the usual construction in the form of heavy plates. The springs B and C are also of usual construction, the same being interposed between the main followers and the corresponding friction shells F and G, respectively, each of said shells F and G having a transversely extending web 10 providing bearings for the inner adjacent ends of the springs.

The wedges D and E are of like construction but oppositely arranged, each having a pair of wedge faces 11—11, the same converging toward the center of the mechanism. In the arrangement shown, the columns or pressure-transmitting plungers L and M are made integral with the wedges D and E, respectively, said plungers extending through suitable apertures in the webs 10—10 of the friction shells.

The friction shells F and G are of like construction, each being provided with a pair of wedge-friction surfaces 12—12 diverging from the respective main end follower so that, when the two shells F and G are in contact corresponding to normal full release position, the two shells together form an interior recess of generally hexagonal outline.

The wedge-friction shoes J and K are of like construction, each being of diamond cross section, as clearly shown in Figures 1 and 2. Each of said wedge shoes is provided with wedge-friction faces 112 and 111 cooperable with a corresponding set of wedge-friction surfaces 12 and 11. In the arrangement shown, each wedge-shoe J and K cooperates with both friction shells and, to save metal and lighten the construction, the wedge-shoes J and K are preferably cored as indicated at 13 in Figures 1 and 2.

The wedge-friction surfaces 12 of the shells are suitably reinforced by laterally extended flanges 14—14 on the exterior thereof as clearly disclosed in the drawing.

In operation, assuming an inward or buffing movement of the drawbar, the front follower A is forced rearwardly, thus moving the front wedge D simultaneously and uniformly therewith. As will be obvious, the rear wedge E remains stationary. As the two wedges D and E approach each other relatively, the wedge-shoes J and K are separated laterally and also travel longitudinally toward the stationary main follower A', during a compression stroke. As the wedge-shoes J—K are separated laterally, there is a corresponding longitudinal separation of the friction shells F and G, thus causing compression of the springs B and C. During the buffing movement, the front spring B will be compressed to an amount equal to the inward movement of the follower A. Similarly, the rear spring C will be compressed to an amount equal to the total movement of the front follower A due to the fact that the rear friction shell G is accelerated longitudinally because of the combined outward and longitudinal movement of the wedge-friction shoes J and K.

From the preceding description, it will be seen that the friction mechanism provides a relatively large amount of friction wearing areas and also may be relatively inexpensively manufactured since only one pattern is required for the two wedges D and E, a single pattern for the wedge-friction shoes J and K, and a single pattern for the friction shells F and G.

I have herein shown and described what I now consider the preferred manner of carrying out my invention, but the same is merely illustrative and I contemplate all changes and modifications that come within the scope of the claim appended hereto.

I claim:

In a friction shock absorbing mechanism, the combination with end followers; of oppositely disposed wedges normally separated longitudinally of the mechanism; columns between each end follower and respective adjacent wedge; wedge friction shoes, each cooperable with both of said wedges; friction shells coacting with said friction shoes, said shells providing a substantially complete enclosure for all of the friction shoes and wedges when the mechanism is in full release and arranged to hold them in operative position, said shells separating during a compression stroke; and cushioning means disposed between the respective end followers and friction shells.

In witness that I claim the foregoing I have hereunto subscribed my name this 18th day of November 1921.

JOHN F. O'CONNOR.